US006379448B1

(12) United States Patent
Sirejacob

(10) Patent No.: US 6,379,448 B1
(45) Date of Patent: Apr. 30, 2002

(54) SILICEOUS SUBSTRATE WITH A SILANE LAYER AND ITS MANUFACTURE

(75) Inventor: Gino Sirejacob, Evergem (BE)

(73) Assignee: ICT Coatings N.V., Deinze (BE)

( * ) Notice: Subject to any disclaimer, the term of this patent is extended or adjusted under 35 U.S.C. 154(b) by 0 days.

(21) Appl. No.: 09/293,413

(22) Filed: Apr. 16, 1999

(51) Int. Cl.$^7$ ............................................ C09D 183/06
(52) U.S. Cl. ..................... 106/287.12; 106/287.13; 106/287.14; 106/287.16
(58) Field of Search ................. 106/287.12, 287.13, 106/287.14, 287.16

(56) References Cited

U.S. PATENT DOCUMENTS

| | | | |
|---|---|---|---|
| 4,879,345 A | 11/1989 | Connelly et al. | 525/104 |
| 5,415,927 A | 5/1995 | Hirayama et al. | 428/307 |
| 5,580,819 A | 12/1996 | Li et al. | 427/167 |
| 5,783,299 A | 7/1998 | Miyashita et al. | 428/329 |

FOREIGN PATENT DOCUMENTS

| | | |
|---|---|---|
| EP | 0513727 A2 | 11/1992 |
| EP | 0548775 A1 | 6/1993 |
| EP | 0657393 A1 | 6/1995 |
| EP | 0679614 | 11/1995 |
| EP | 0748659 A2 | 12/1996 |
| EP | 0842908 A1 | 5/1998 |
| EP | 0887394 A1 | 12/1998 |
| WO | 97/20005 | 6/1997 |
| WO | 98/12085 | 3/1998 |

OTHER PUBLICATIONS

XP—002142753—Abstract.
International Search Report, International Application No. PCT/BE 00/00033 mailed Jul. 26, 2000.
V.L. Francen, et al., "Fluorochemical Glass Treatments", *The Glass Industry*, 46, (1965), p. 594.

*Primary Examiner*—D. S. Nakarani
(74) *Attorney, Agent, or Firm*—Ostrolenk, Faber, Gerb & Soffen, LLP

(57) ABSTRACT

A siliceous substrate having a face which is at least partly provided with a water-repellent layer having a thickness of no greater than 5000 Angstroms, said layer being a layer of at least one fluoro aliphatic silane compound having at least one silicon atom chemically bound to the siliceous substrate and chemically bound to the silicon atom of another fluoro silane compound of the layer.

22 Claims, No Drawings

SILICEOUS SUBSTRATE WITH A SILANE LAYER AND ITS MANUFACTURE

THE PRIOR ART

Many attempts have been made for improving the water-repellent property of glasses by applying onto said glasses a silicon layer, as well for improving the adhesion of the protective and water-repellent layer on the glasses.

For example, U.S. Pat. No. 5,415,927 teaches an inorganic or organic glass product, or tempered glass product excellent in weatherability, water resistance, moisture resistance and abrasion resistance, which is formed of a) a silicate glass substrate, b) a porous modified layer enriched with silicon oxide through removal of components other than silicon oxide in a surface layer of the silicate glass substrate, and c) a water-repellent layer formed of at least one compound of an organic silicon compound and an organic fluorine compound on a surface of the porous modified layer. The porous modified layer is prepared by etching the outer surface of the substrate, said etching being carried out by treating the substrate by means of HF (hydrofluoric acid).

Such an acid treatment attacks the glass and can be to aggressive for glasses having small defects.

It has also been proposed (U.S. Pat. No. 5,580,819) to provide a coating on a substrate, such as glass, ceramics, metals, and organic polymeric materials. The coating composition comprises, in combination, acid catalyzed hydrolysis and condensation products of water-silane monomer mixture and a film forming amount of a polymer having functional groups selected from amino, hydroxy and carboxy, hydroxy and amino, amino and carboxy, and amino, hydroxy and carboxy. The described process comprises applying the aforesaid coating composition (or an acid catalyzed sol-gel coating composition) substantially free of performed oxide sol and water soluble metal salt to the surface of a solid substrate, curing the applied coating, and treating the cured coating with an aqueous electrolyte solution for a time sufficient to produce a coating having graded porosity which is antireflective over a broad band of the visible spectrum.

The water-repellent property of a glass substrate provided with such a layer is not sufficient.

It has also been suggested to provide substrates with fluorinated coatings, for example by applying a fluoro aliphatic silicon layer on a glass. Even, if such coatings have some chemical resistance properties and some water-repellent properties, these coatings are not resistance against an attack by means of a sodium hydroxide solution.

The invention relates to siliceous substrate provided with a coating having excellent chemical resistance properties and excellent water-repellent properties.

BRIEF DESCRIPTION OF THE INVENTION

The invention relates to a siliceous substrate having a face which is at least partly 30 provided with a water-repellent layer having a thickness of no greater than 5000 Angstroms, said layer being a layer of at least one fluoro silane compound having at least one silicon atom chemically bound to the siliceous substrate and chemically bound to the silicon atom of another fluoro silane compound of the layer, said layer having such chemical bounds with the siliceous substrate and such chemical bounds between silicon atoms of the layer that it has a chemical resistance of at least 1 minute against the action of an aqueous solution containing 25% by weight of sodium hydroxide and having a temperature of 25° C. Preferably, said fluoro silane layer has a delta haze of less than 0.3% measured by the method ASTM D 1044-94, using a Taber abraser under the conditions where the abrading wheel was a CS- 10F wheel, the load was 500 g and the number of rotations was 1,000. In case said layer is substantially completely cured, said delta haze can be reduced to less than 0.1%.

According to a preferred embodiment, the fluoro silane layer has such chemical bounds with the siliceous substrate and such chemical bounds between silicon atoms of the layer that it has a chemical resistance of at least 24 hours against the action of concentrated phosphoric acid at a temperature of 25° C.

Preferably, the treated face of the siliceous substrate of the invention has also a chemical resistance of at least 1 minute against the action of at least the following agents: soap solution, alcohol, isopropanol, isoparaffinic hydrocarbon, acetone, diacetonalcohol, methylethyl ketone, concentrated HCl, concentrated formic acid, 25% KOH solution, and gazoline.

The treated face of the siliceous substrate of the invention (face provided with the fluoro silane layer) has preferably a very low surface energy, so as to ensure a high water-repellency.

It has been observed that it was not possible to mark the treated face of the siliceous substrate of the invention siliceous substrate with a solvent based ink or paint, whereby the fluoro silane layer of the siliceous substrate of the invention provides a good anti graffiti protection.

Advantageously, the layer is a layer of fluoro aliphatic silane, said aliphatic group of said silane being a fluoro linear alkyl group with 2 to 20, preferably 3 to 12 carbon atoms, said alkyl group being substantially fully substituted with fluorine atoms. Said aliphatic group contains advantageously 3 to 40 fluorine atoms, preferably 5 to 25 fluorine atoms, most preferably from 13 to 20 fluorine atoms.

The invention relates also to a process for the preparation of a siliceous substrate provided with a fluoro polysiloxane layer prepared by polymerizing at least a fluoro silane derivative, in which at least a part of a face of the siliceous substrate is contacted with a composition containing 0.1 to 10% by weight fluoro polysiloxane compound, at least a polar solvent for said fluoro silane, less than 10% water (preferably less than 5% by weight water, most preferably less than 2% by weight water) and at least an acid system for lowering the pH of the composition to less than 4, preferably less than 2, most preferably less than 1, especially less than 0.5, said pH being measured at 25° C. by using a LiCl electrode with an open sleeve, and in which said part of the face in contact with the said composition is dried at a temperature and during a period of time so as to obtain on said part, a fluoro polysiloxane layer having such chemical bounds with the siliceous substrate and such chemical bounds between silicon atoms of the layer that it has a chemical resistance of at least 1 minute against the action of an aqueous solution containing 25% by weight of sodium hydroxide and having a temperature of 25° C.

In the process according to the invention, the composition advantageously contains substantially no water.

Advantageously, prior to be contacted with the solution, the said part of the face is washed, for example decreased, while after to be contacted with the solution, the said part of the face is rinsed, for example with a solvent, a polar solvent, especially with the solvent used in the fluoro polysiloxane composition.

According to an embodiment of the process, the drying or curing of the composition is carried out at room temperature. A substantially complete drying of curing of the fluoro polysiloxane layer can be reached after about 24 hours.

Preferably, possibly after drying or removal of solvent or water, said face is subjected to a heat treatment at a temperature from 60° C. up to about 250° C., for example from 60° C. to about 200° C., in an oxidative atmosphere or up to about 350° C. in a non-oxidative atmosphere.

The siliceous substrate is advantageously selected from the group consisting of glass, glass containing substrates, ceramics and silicate surfaces.

The composition to be applied is preferably prepared by mixing a first composition substantially free of water containing a fluoro silane derivative and an organic polar solvent for said fluoro silane in an amount sufficient for dissolving substantially completely the fluoro silane derivative, with a second composition containing less than 20% by weight water, at least an organic polar solvent and an acid system sufficient for obtaining when mixing the first composition with the second composition a pH lower than 4 (advantageously lower than 2, preferably lower than 1, most preferably lower than 0.5), said pH being measured at 25° C. by using a LiCl electrode with an open sleeve.

The invention further relates to kits for the preparation of the composition to be applied on the siliceous substrate.

Advantageously, a kit according to the invention is a kit for the preparation of a composition for applying to a siliceous substrate a flouro polysiloxane layer, which after drying has a chemical resistance of at least 1 minute against the action of an aqueous solution containing 25% by weight of sodium hydroxide and having a temperature of 25° C., said kit comprising a first container containing a first composition and a second container comprising a second composition, the first and second compositions having at least partly to be mixed together before its application to the siliceous substrate, in which the first composition is substantially free of water and acid and comprises 0.1 to 100% (advantageously 1 to 75, preferably 2 to 70, most preferably 2.5 to 10%) by weight flouro silane derivative and 0 to 99% by weight organic polar solvent system for said fluoro silane derivative (preferably an amount of polar solvent sufficient for ensuring the substantially complete dissolution of the fluoro silane derivative), while the second composition comprises at least an organic polar solvent for the fluoro silane derivative, less than 20% (advantageously less than 10%, preferably less than 5%) by weight water and an acid system, and acid system being sufficient for ensuring when mixing a part of the first composition with a part of the second composition for the preparation of the mixture to be applied on the siliceous substrate, a pH lower than 4 (advantageously lower than 2, preferably lower than 1, most preferably lower than 0.5), said pH being measured at 25° C. by using a LiCl electrode with an open sleeve, while the amount of polar solvent in the first and second compositions is at least sufficient for ensuring when mixing a part of the first composition with a part of the second composition an amount of polar solvent at least sufficient for ensuring substantially the complete dissolution of the fluoro silane derivative.

The use of kits is advantageous for avoiding as much as possible water undue hydrolysis of the fluoro silane derivative before applying the composition on the siliceous substrate, while the use of hydrochloric acid is advantageous for accelerating the formation of an oxygen bound between two silicon atoms, for dissolving possible impurities present at the surface of the container.

DESCRIPTION OF THE INVENTION

A first object of the invention is a siliceous substrate having a face which is at least partly provided with a water-repellent layer having a thickness of no greater than 5000 Angstroms, said layer being a layer of at least one fluoro silane compound having at least one silicon atom chemically bond to the siliceous substrate and chemically bound to the silicon atom of another fluoro silane compound of the layer, said layer having such chemical bounds with the siliceous substrate and such chemical bounds between silicon atoms of the layer that it has a chemical resistance of at least 1 minute against the action of an aqueous solution containing 25% by weight of sodium hydroxide and having a temperature of 25° C.

Said fluoro silane layer is advantageously at least substantially free of organic polymer, film forming organic polymer, and silane without flourine atoms.

Advantageously, said fluoro silane layer has a delta haze of less than 0.3%, preferably lower than 0.1%, measured by the method ASTM D 1044-94, using a Taber abraser under the conditions where the abrading wheel was a CS-10F wheel, the load was 500 g and the number of rotations were 1,000.

According to a preferred embodiment, the fluoro silane layer has such chemical bounds with the siliceous substrate and such chemical bounds between silicon atoms of the layer that it has a chemical resistance of at least 24 hours against the action of concentrated phosphoric acid at a temperature of 25° C.

Preferably, the layer of the siliceous substrate of the invention has also a chemical resistance of at least 1 minute against the action of at least the following agents: soap solution, alcohol, isopropanol, isoparaffinic hydrocarbon, acetone, diacetonalcohol, methylethyl ketone, concentrated HCl, concentrated formic acid, 25% KOH solution, and gazoline.

The surface energy of the fluoro layer is advantageously lower than 12 dynes/cm, preferably lower than 8 dynes/cm, most preferably about 6 dynes/cm.

Preferably, the layer is a layer of fluoro aliphatic silane, most preferably a layer of fluoro aliphatic silane, and aliphatic group of said silane being a fluoro linear alkyl group with a end carbon linked to three fluorine atoms.

The layer is for example a polysiloxane layer of the formula

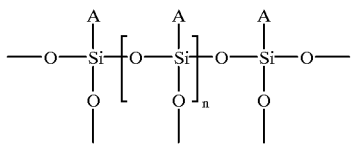

with A: a linear aliphatic group substituted with fluorine atoms in which the remaining O groups form chemical bounds with the siliceous substrate.

The linear aliphatic group is preferably a linear alkyl group comprising 1 to 12 carbon atoms, advantageously from 2 to 10 carbon atoms, said alkyl group being most preferably substantially fully substituted with fluorine atoms.

The fluoro silane layer is preferably a monolayer with a thickness of less than 1 μm, said thickness depending of the length of the fluorinated alkyl group.

The siliceous substrate is for example glass, ceramics and silicate surfaces, but is preferably glass, a glass sheet suitable for buildings, bathroom, cars, ceramic tiles, etc. The substrate, if required, can comprise a high refractive index glass.

Preferably, the fluoro polysiloxane layer is a monolayer consisting essentially of organosilanes selected from the group consisting of tridecafluorotetrahydrooctyltrihydroxy silane of the formula $CF_3\text{—}(CF_2)_5\text{—}(CH_2)_2\text{—}Si(OH)_3$ and perfluorodecyltrihydroxysilane of the formula $CF_3\text{—}(CF_2)_7\text{—}(CH_2)_2\text{—}Si(OH)_3$ regularly grafted into polysiloxane patterns and regularly bound to silicon atoms of the siliceous substrate. All the bounds between the silicon atom of the substrate and the silicon atom of the silane are substantially covalent bonds (—O—).

Another subject matter of the invention is a process for the preparation of a siliceous substrate provided with a fluoro silane layer,
- in which at least a part of a face of the siliceous substrate is contacted with a composition containing 0.1 to 10% by weight fluoro silane derivative, at least a polar solvent for said fluoro silane derivative, less than 10% water (preferably less than 5% by weight water, most preferably less than 2 % by weight water) and at least an acid system for lowering the pH of the composition to less than 4, preferably less than 2, most preferably less than 1, especially less than 0.5, said pH being measured at 25° C. by using a LiCl electrode with an open sleeve, and
- in which said part of the face in contact with said composition is dried at a temperature and during a period of time so as to obtain on said part, a flouro silane derivative layer having such chemical bounds with the siliceous substrate and such chemical bounds silicon atoms of the layer that it has a chemical resistance of at least 1 minute against the action of an aqueous solution containing 25% by weight of sodium hydroxide and having a temperature of 25° C.

In the process according to the invention, the composition advantageously contains substantially no water.

Advantageously, prior to be contacted with the solution, said part of the face is washed, for example degreased, while after to be contacted with the solution, said part of the face is rinsed, for example with a solvent for the fluoro silane derivative.

The drying and curing of the composition applied onto the substrate is preferably carried out after removal of the excess of composition present on the substrate, for example by using a wool cloth or fabric, a cotton cloth or fabric, etc. Said cloth or fabric can also be used for ensuring a good application of the composition on the whole surface, especially along the edge of the siliceous substrate.

The application, as well as the drying and curing of the composition can be carried at outside temperature in an uncleaned (non-cleaned) atmosphere. For example the application, as well as the drying and curing can be carried out at temperature from −50° C. up to the degradation of the fluoro polysiloxane layer. It is obvious that the application and the drying and curing of the composition can be carried out in a cleaned atmosphere. It is for example possible to apply the composition on the glass sheet or glass pieces just after its manufacture, for example after a cooling step.

When the drying is carried out at a lower temperature, the time required for obtaining a sufficient drying and curing will be longer.

The application is for example carried out at a temperature comprised between 0 and 50° C. The drying and curing can be carried out in this range of temperature.

According to an embodiment of the process, the drying or curing of the composition is carried out at room temperature, without requiring a cleaned atmosphere. A substantially complete drying or curing of the fluoro polysiloxane layer can be reached after about 24 hours.

Preferably, possibly after drying or removal of solvent or water, said face is subjected to a heat treatment at a temperature from 60° C. up to about 250° C., for example from 60° C. to about 200° C., in an oxidative atmosphere or up to about 350° C. in a non-oxidative atmosphere.

Said composition is advantageously at least substantially free of organic polymer, of film forming organic polymer, of silane without fluorine atoms, so that the layer is substantially only formed by fluoro polysiloxane.

The selection of HCl, possibly mixed with another acid not attacking the siliceous substrate, allows the contact of the siliceous substrate with a composition having a very low pH, and allows the formation of a water-repellent layer having excellent chemical resistance. As the composition applied to the siliceous substrate is substantially free of water, the pH is determined by using a LiCl electrode.

The drying step can be a mechanical removal of excess of composition and polar solvent present on the siliceous substrate or of an excess of water or solvent (preferably polar solvent) used for rinsing the substrate after being contacted with the composition. However, advantageously, prior to be contacted with the solution, said part of the face is washed (for example decreased), while after to be contacted with the solution, said part of the face is rinsed. The drying step is preferably carried out at least partly at a temperature sufficient for making covalent bounds (oxygen bounds) between the layer and the substrate. Said drying can be carried out at a temperature comprised between −20° C. and 250° C. in an oxidative atmosphere and between −20° C. and about 350° C. in a non-oxidative atmosphere. The drying can be done possibly under vacuum.

Before contacting a face of the siliceous substrate with the silane derivative composition, said face can be partly or completely treated so as to ensure that the surface is dust free, fat free and free of silicone or other compounds grafted to the face of the siliceous substrate on which a fluoro polysiloxane layer according to the invention has to be applied, and/or so as to ensure a kind of abrasion of said face (for example by projection of small high resistant particles or particle dusts, for example of SiC particles or dust.

Such washing or cleaning pretreatment includes ultrasonic cleaning: washing with an aqueous mixture of organic solvent, e.g., a 50:50 mixture of isopropanol water or ethanol water; activated gas treatment, e.g., treatment with low temperature plasma or corona discharge, and chemical treatment such as hydroxylation, i.e., etching of the surface with an aqueous solution of alkali, e.g., sodium hdyroxide or potassium hydroxide, that may also contain a fluorosurfactant, washing of the glass with an aqueous solution that may contain a low foaming, easily rinsed detergent, followed by rinsing and drying with a lint-free cloth; and ultrasonic bath treatment in heated (about 50 degree C.) wash (preferably deionized) water followed by rinsing and drying. A pre-cleaning with an alcohol-based cleaner or organic solvent prior to washing may be required to remove adhesives from labels or tapes. Cleaning may also advantageously comprise a publishing step. After drying, the base or glass sheet may be washed with a polar solvent, specifically a chlorinated solvent and/or a fluorinated solvent. Alternatively, and preferably, the base is exposed to an oxidizing atmosphere to improve the reactivation of the glass: for example, to a combination of ozone and UV radiation. It is clear that the siliceous substrate or glass can be submitted to various washing and cleaning pre-treatments. For removing silicone oil or compounds possibly grafted to the siliceous substrate, the substrate can be treated with ammonium fluoride solution, potassium hydroxide (at boiling temperature), HF, Silstrip Liquid® of PENN-WHITE (UK), etc.

In the process according to the invention, the composition when being applied on the substrate still contains polysiloxane oligomer (product of condensation of silane monomer or silanol) with up to 6 Si atoms, preferably with up to 3 Si atoms.

Polar solvents (water is not a solvent for the fluoro silane used in the process of the invention) which can be used in the process of the invention are for example fluorine-containing polar solvents, aliphatic or aromatic polar solvents, ketones, esters and mixtures thereof, such as alcohol, ethyl acetate, tetrahydrofuran, mono ethylene glycol, diethylene glycol, triethylene glycol, etc. Advantageously, the polar solvent is selected from the group consisting of $C_1$–$C_6$ alkanol, and aliphatic alcohols of the empirical formula:

$$[(R^3)_iR^4](C_1\text{–}C_6)OH$$

wherein $R^3$ and $R^4$ are each $C_1$–$C_4$ alkoxy, and i is the integer 0 or 1, and mixtures thereof. Advantageously, the organic polar solvent has at least one OH group, but preferably only one OH group. Preferred example of polar solvents are methanol, ethanol, 2-ethoxyethanol, 2-(2-methoxyethoxy)ethanol, 2-methoxy ethanol, 2-(2-ethoxymethoxy)ethanol, 1-propanol, 2-propanol, 1-methoxy-2-propanol, and mixtures thereof (methanol, ethanol, methoxy-ethanol, propanol and mixtures therof being the most preferred).

Phthalic acid esters, such as diethyl phthalate, can also be used as polar solvent suitable for the fluoro silane derivative. In such a case, the composition contains for example only phthalic acid ester(s) as solvent. For example the composition contains 90 to 99.5% phthalic acid ester.

It is advantageous to add to the composition a surfactant, so as to further improve the already substantially homogenous spreading of the composition on said part of the face of the siliceous substrate. For example, the composition contains from 0.01 to 1.0% by weight of surfactant. The surfactant can be an anionic, cationic, nonionic or amphoteric surfactant. Preferred surfactants are anionic surfactants, especially ethoxylated alcohols, ethoxylated alkylphenols, ethoxylated carboxylic esters, ethoxylated carboxylic amides, and fluorosurfactants, and cationic surfactants such as amine, alkyl betaine, alkyl amido betaine.

The composition contains advantageously from 0.1 to 20%, advantageously from 0.2 to 10%, preferably from 0.6 to 5% by weight of phthalic acid ester (i.e. one specific phthalic acid ester or a mixture of phthalic acid esters).

Advantageously, the phthalic acid ester is selected from the group consisting of di (alkyl $C_2$–$C_{18}$) phthalates and mixtures thereof. Preferred examples of phthalic acid ester are: diethyl phthalate, dipropyl phthalate, dibutyl phthalate, dipentyl phthalate, dihexyl phthalate, dioctyl phthalate, di isopropyl phthalate, di isobutyl phthalate, di isopentyl phthalate, di isohexyl phthalate, di isoctyl phthalate and mixture thereof.

The use of such compound is advantageous so as it seems to limit a possible undue hydrolysis of silane derivative, especially of fluoro silane, due to the presence of humidity in the air, so as to improve the stability of the composition, and so as to increase the wetting of the siliceous substrate by means of the composition.

The use of these phthalic acid ester(s), advantageously di(alkyl $C_2$–$C_{18}$) phthalates, is especially advantageous when used in combination with a solvent selected from the group consisting of methanol, ethanol, methoxy-ethanol, propanol and mixture thereof and with one or more hydrolisable compounds of an element selected in the main group III to V of the periodic system of elements, as well as in the sub groups II to IV of said periodic system, said compound(s) comprising at least one non hydrolisable carbon containing group and at least two hydrolisable groups.

It can also be advantageous to add to the composition specific additives, such as UV blockers or blocking or absorbing agents (for example from 0.01 to 1% by weight), optical brighteners or brightening agents (for example from 0.01 to 1% by weight), IR blocking or absorbing agents (for example from 0.01 to 1% by weight), etc. As examples of said additives, the additives mentioned in EP0679614, the content of which is incorporated by reference, are suitable.

According to an advantageous process of the invention, the composition contains a fluoro silane selected from the group consisting of fluoro aliphatic silanes with one silicon atom chemically bound to three hydroxy groups, ethers of said fluoro aliphatic silane derivatives, partial hydrolysis products of said ethers, linear fluoro aliphatic polysiloxanes of the formula

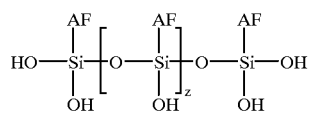

in which

AF is a fluoro aliphatic group, the end carbon of said aliphatic group being preferably bound to 3 fluorine atoms, and Z is an integer from 0 to 6, and mixtures thereof.

Preferably, the composition contains a fluoro silane derivative selected from the group consisting of fluoro aliphatic silane derivatives with one silicon atom chemically bound to three hydroxy groups and with an aliphatic group substantially fully substituted with fluorine atoms (preferably tridecafluorotetrahydrooctyltrihydroxysilane, perfluorodecyltrihydroxysilane or heptafluorotetrahydrodecyltrihydroxysilane), ethers (preferably low alkyl ether, such as methyl, ethyl ether) of said fluoro aliphatic silane derivative, linear fluoro aliphatic polysiloxanes of the formula

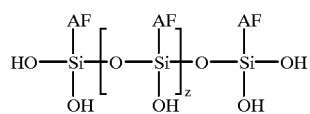

in which

AF is a fluoro linear aliphatic group with 2 to 10 carbon atoms, said aliphatic group being substantially fully substituted with florine atoms, and Z is an integer from 0 to 6, and mixtures thereof.

Most preferably, AF is a fluoro linear aliphatic group selected from the group consisting of $CF_3(CF_2)_5$—$(CH_2)_2$— and $CF_3(CF_2)_1-(CH_2)_2-$ and $CF_3-(CF_2)_9-$ and a and mixtures thereof. For example, the silane is a mixture of 25 to 75% by weight tridecafluorotetrahydrooctyltrihydroxysilane, and 75 to 25% by weight perfluorodecyltrihydroxysilane or heptafluorotetrahydrodecyltrihydroxysilane.

The siliceous substrate is preferably contacted with the solution at a temperature comprised between 0 and 50° C., for example at room temperature or at a temperature lower than 15° C. The application can be carried out in a non cleaned atmosphere. Low temperatures are preferred so as to avoid as much as possible cross-linking of silane derivatives and so as to reduce as much as possible the formation of larger oligomer in the composition before being applied on the substrate.

In an advantageous embodiment of the process according to the invention, after applying the composition onto a face of the substrate, and face is submitted to a rubbing with a cloth or fabric, especially with a wool fabrice or cloth. It seems that the rubbing of material, such as a wool fabric, suitable for creating static force against the surface of the substrate on which the composition has been applied is advantageous for ensuring an excellent application of the composition onto said face. Said rubbing can be done manually or mechanically, for example by means for a rotative head provided with a wool fabric.

In an advantageous embodiment of the process, after contacting the said face of the substrate with the composition, the said face is rinsed (for example, by means of water, a polar solvent or a mixture thereof) so as to remove the excess of silane present on the substrate and dried at leastly partly at a temperature lower than 50° C. (for example by means of dry air, air having a relative humidity lower than 60%). Preferably, the drying is carried out in a first step by a mechanical treatment so as to remove at most completely the solvent present on the surface of the substrate. After a possible drying step of the substrate and/or the mechanical removal of the excess of silane, it is advantageous to submit the face of the substrate to a heat treatment at a temperature above 50° C., for example from 60° C. up to 200° C., so as to increase the formation of bounds (oxygen bounds) of polysiloxane oligomers with the substrate and therebetween. Said heat treatment can be carried out at higher temperature lower than the degradation temperature of the polysiloxane, for example up to 350° C., in a non oxidative atmosphere. In oxidative atmosphere, it is advisable to use about 250° C. as maximum temperature. Such a heat treatment is also a drying step.

The drying step can also be carried out a low temperature, for example at room temperature in a cleaned atmosphere as well as in a non-cleaned atmosphere. In this case, the time necessary for obtaining a sufficient condensation of silane derivative with the substrate is longer (for example 15 to 36 hours especially about 24 hours).

The process of the invention can be carried out various siliceous substrate, such as glass, ceramics, ceramics tiles and silicate surfaces.

In the process of the invention, it is preferable to prepare the composition shortly before it uses, for example at least 10 minutes before its application onto the substrate, for example at least about 20 minutes before its application onto the substrate. Therefore, the composition is preferably prepared by mixing a first composition substantially free of water containing a fluoro silane derivative and an organic polar solvent for said fluoro silane derivative in an amount sufficient for dissolving substantially completely the fluoro silane derivative, with a second composition containing less than 20% by weight water, at least an organic solvent and an acid system sufficient for obtaining when mixing the first composition with the second composition a pH lower than 4, preferably lower than 2, most preferably lower than 1, especially lower than 0.5, said pH being measured at 25° C. by using a LiCl electrode with an open sleeve.

In the process according to the invention, the solvent used in the second composition is advantageously the solvent used in the first composition, so as to be sure to obtain a substantially homogenous mixing of the acid system, especially HCl, with the silane. Preferably a fluoro silane ether is used in the first composition, said fluor silane ether being due to hydrolysis converted into silanol, which is converted by condensation into oligomer.

For the preparation of a composition for applying to a siliceous substrate a fluoro polysiloxane layer having a chemical resistance of at least 1 minute against the action of an aqueous solution containing 25% by weight of sodium hydroxide and having a temperature of 25° C., it is advantageous to use a kit so as to be able to prepare the composition shortly before its application on the siliceous substrate.

According to a kit of the invention, the kit for the preparation of a composition for applying to a siliceous substrate at fluoro polysiloxane layer, which after sufficient drying (for example after 24 hours at room temperature or after 30 minutes at 130° C.) has a chemical resistance of at least 1 minute against the action of an aqueous containing 25% weight of sodium hydroxide and having a temperature of 25° C., preferably of at least 24 hours against the action of concentrated phosphoric acid at 25° C., said kit comprising a first container containing a first composition and a second container comprising a second composition, the first and second compositions having at least partly to be mixed together before its application to the siliceous substrate, in which the first composition is substantially free of water and acid and comprises 0.1 to 100% (advantageously 1 to 75, preferably 2 to 70, most preferably 2.5 to 10%) by weight fluoro silane derivative and 0 to 99.9% by weight organic polar solvent system for said fluoro silane derivative (preferably an amount of polar solvent sufficient for ensuring the substantially complete dissolution of the fluoro silane derivative), while the second composition comprises at least an organic polar solvent for the fluoro silane derivative, less than 20% (advantageously less than 10%, preferably less than 5%) by weight water and an acid system, and acid system being sufficient for ensuring when mixing a part of the first composition with a part of the second composition for the preparation of the mixture to be applied on the siliceous substrate, a pH lower than 4 (advantageously lower than 2, preferably lower than 1, most preferably lower than 0.5), said pH being measured at 25° C. by using a LiCl electrode with an open sleeve, while the amount of polar solvent in the first and second compositions is at least sufficient for ensuring when mixing a part of the first composition with a part of the second composition an amount of polar solvent at least sufficient for ensuring substantially the complete dissolution of the fluoro silane derivative.

The first and second compositions are advantageously at least substantially free of organic polymer, film forming organic polymer, and silane without fluorine atoms.

The first composition and/or second composition advantageously contain from 0.1 to 10% of a surfactant, for example a surfactant as disclosed here above in the description of the process of the invention.

Advantageously, the second composition contains from 0.5 to 20% of acid system. An acid system which perfectly works is an acid system containing at least hydrochloric acid. Said composition contains for example from 0.5 to 10%, especially from 1 to 6% by weight hydrochloric acid. When using concentrated hydrochloric acid solution for the preparation of the second composition, some water will be present in the second composition. Therefore, in order to have the lowest possible water content in the mixture of first and second compositions, the acid will be diluted with a water free solvent for the fluoro silane derivative, especially with a water free polar solvent for the fluoro silane derivative or a mixture of a water free polar solvent for the fluoro silane derivative and a water free non polar solvent for the fluoro silane derivative.

As polar solvent to be used in the first composition as well as in the second composition, fluorine-containing polar solvents, aliphatic or aromatic polar solvents, ketones, esters, alcohol, acetone, tetrahydrofuran, diethylene glycol, etc. and mixtures thereof can be used. Preferred polar solvents are $C_1$–$C_6$ alkanol, and aliphatic alcohols of the empirical formula.

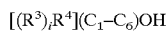

wherein $R^3$ and $R^4$ are each $C_1$–$C_4$ alkoxy, and i is the integer 0 to 1, and mixtures thereof. For example, preferred polar solvents are methanol, ethanol, 2-ethoxyethanol, 2-(2-methoxyethoxy) ethanol, 2-methoxy ethanol, 2-(2-ethoxymethoxy) ethanol, 1-proponal, 2-propanol, 1-methoxy-2-propanol, and mixtures thereof. Most preferred polar solvents are methanol, ethanol, 1-proponal, 2-proponal, 2-methoxy ethanol and mixtures thereof.

The first and/or second compositions advantageously contain phthalic acid ester, for example from 0.1 to 20% (preferably less than 10%) by weight, and/or any other water insoluble substance soluble in the solvent for the fluoro silane derivative, especially soluble in alcohol, ethanol, etc. The preferred phthalic acid esters are the phthalic acid esters mentioned hereabove in the description of the process according to the invention.

The first composition and/or the second composition can possibly comprise as polar solvent, only phthalic acid ester (s), for example diethyl phthalate. In this case, the first and or second composition can comprise up to 99.9% phthalic acid ester.

The phthalic acid ester content of said first and/or second composition can thus possibly vary between 0.1 and 99.9%.

The fluoro silane derivative of the preferred composition is preferably fluoro silane derivative disclosed in the process of the invention:

The second composition can contain a cationic surfactant, such as an amine. The first and/or second compositions can contain some additives, such as UV blocking agents, IR blocking agents, brightening agents, etc as disclosed in the description of the process of the invention.

The first composition is substantially free of water and acid, and is preferably free of polymeric material such as polyethylene, PET, etc. organic silane not bound to flourine atoms and film forming agents. The second composition is advantageously free from HF and free from polymeric material, organic silane, and film forming agents or polymers.

According to an embodiment of the kit, the first and/or second compositions contain a cationic surfactant.

The first and second compositions of the kit of the invention are advantageously mixed together in a weight ratio second composition/first composition(silane containing composition) comprised between 1000:1 and 1:10, preferably between 200:1 and 1:5, more preferably between 100:1 and 1:2; for example in one of the following weight ratios: 100:1; 50:1; 20:1; 10:1; 5:1; 2:1 and 1:1.

The siliceous substrate of the invention is for example:

a glass sheet, for a window, a window car, window boat, window of airplanes, control windows of reactors, etc.; the cleaning of the glass sheet being very easy, there are less impacts of insects, less dirt, . . . , especially a wiper blade provided with a fluoro layer or a fluorinated layer (for example a wiper blade according to WO 9812085) is used with such windows;

glasses, wineglasses, etc.; whereby a correct washing of the glasses can be carried by using only water;

contact lenses, objectives (for example of microscopes, cameras, etc.);

a solgel containing $SiO_2$ particles;

$SiO_2$ particles used in toner, as additives in organic or inorganic composition, in come net, in paints, in fluidised bed, in filters (as filter cake for example), in screenings, in classification processes, in heavy media separation processes, etc.;

Lamps, neon lamps, etc.;

Transportation protection sheet of solar electrical cells;

Bottles, vials, tubes, glass syringes, etc., said bottles, vials, tubes, syringes having at least the inner face provided with a fluoro layer and preferably also the outer food provided with a fluoro layer, so that the washing and/or the sterilisation and/or removal of labels, glued labels is easier, said bottles vials and tubes being advantageously closed by means of a stopper (for example a rubber stopper) provided with a fluoro layer or a fluorinated layer so as to have a good sealing contact between the stopper and the neck of the bottles, vials or tubes, while said syringes have advantageously a plunger provided with a fluoro layer or a fluorinated layer so as to have a good sealing and a low friction when moving the plunger;

Glass fibres, such as optical fibres, glass wool for isolation purposes, for filtering purposes, etc;

High voltage isolators;

Kiezelghur particles for example for filtering purposes;

Analysis tube, control tube, level control system;

Reactor, chemical reactor, condensers, falling film exchangers, reactors, absorbers, etc.;

Sanitary installations;

Enamel or porcelain surfaces, such as wash basin or vat, etc.;

Siliceous substrate with an anit adhesion surface for the manufacture of micro lenses, etc.,;

Siliceous substrates as casting moulds,

Siliceous packing elements for towers, such as absorption tower;

Earthenware;

Glass films;

etc.

DESCRIPTION OF SPECIFIC AND PREFERRED EMBODIMENTS

EXAMPLE 1

A first composition A has been prepared by adding absolute ethanol and diethyl phthalate to a solution of silane ether (60% silane/40% ethanol) of the following formula

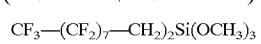

in ethanol.

Said first composition A which was substantially water free, was an ethanol solution containing about 4% by weight of said silane ether and 1% by weight diethyl phthalate. The first composition was placed in a first glass container.

A second composition B was prepared by mixing concentrated hydrochloric acid (37%), ethanol, and diethyl phthalate. Said composition contains 94% by weight ethanol, 4% by weight concentrated hydrochloric acid, 1% diethyl phthalate and 1% diethylene amine. The composition had thus a water content lower than about 2.5%. The second composition was placed in a second container.

30 minutes before applying the composition, the content of said first and second containers have been agitated and thereafter mixed together in a weight ratio of 1 part of the first composition per 1 part of the second composition. The pH of the mixture was measured by using a Multi-meters pocket "Multiline P4" of WTM sold by VEL (Leuven, BELGIUM) provided with a LiCl electrode (open sleeve electrode. pH Flushtrode with LiCl) of Hamilton (USA) sold by VEL. Such an electrode is a known electrode for measuring a pH in a polar medium, as well as in a non polar solvent. Even if the pH is measured preferably by using this electrode, other electrodes suitable for measuring pH in polar solvent can be used. The pH was measured at 25° C., even if the Multi-meters apparatus was provided with a system for compensating the variation of the pH in function of the temperature. The apparatus was calibrated by using buffers having respectively a pH of 1.00, 2.00, 3.00, 4.01, 6.99 and 8.98. According to this method of determination of the pH, the pH of the mixture was lower than 0.5 (a negative measure was even determined).

The mixture was then applied on a glass sheet by dipping the glass sheet in a bath containing the mixture. Before applying the mixture, the glass sheet was cleaned and degreased by means of aqueous solution and organic polar solvents.

After dipping, the excess of solution on the glass sheet was removed by rubbing a wool fabrice against the glass sheet. Thereafter, the glass sheet was washed with an aqueous alcohol solution.

The so treated glass sheet was then heated at 130° C. during 30 minutes for drying and curing the layer with the substrate (formation of covalent oxygen bounds between the siliceous substrate and the silane layer).

The so obtained layer was a mono layer, having a thickness of lower than 1 $\mu$m (thickness corresponding substantially to the length of $CF_3$—$(CF_2)_7$—$(CH_2)_2Si$).

Tests have been made on the treated glass in order to determine its properties. The results of these tests are the following:

Resistance tests

For these tests, two drops of a fluid have been applied for 1 minutes on the coated glass. A first drop has been removed after a rubbing with a paper cloth and thereafter wiped with cotton, while a second drop was removed without rubbing with a paper cloth and thereafter wiped with cotton. The resistance of the coating to the fluid was determined by checking for tackiness, by examining the crazing, by examining the loss of transparency and hydrofobicity.

The results of these examinations are that the coating has a resistance to various chemicals, namely:
Resistance to boiling water
Resistance to non abrasive soap solution (2% soap content)
Resistance to non abrasive concentrated soap solution (100% soap)
Resistance to alcohol (absolute)
Resistance to isopropanol
Resistance to isoparaffinic hydrocarbon (isopar c)
Resistance to boiling acetone
Resistance to diacetonalcohol
Resistance to methyl ethyl ketone (MEK)
Resistance to sec. Butanol
Resistance to concentrated HCl (37%)
Resistance to sulphuric acid (99%)
Resistance to diluted NaOH (resistance of at least 1 minute after applying at 25° C. an aqeuous solution containing 5% NaOH)
Resistance of at least 1 minute to an aqueous solution containing 25% NaOH
Resistance of at least 1 minute to an aqueous solution containing 25% KOH
Resistance of nitric acid (68%)
Resistance to formic acid (99%)
Resistance to gazoline
Resistance to guano Furthermore, the layer had a resistance of at least 24 hours against the action of concentrated phosphoric acid (99%) at 25° C., as well at the boiling temperature.

Water-repellant tests

The layer was still water-repellant after 3000 hours. For said test water is running continuously on the coating from a high of 50 cm, the glass plate being positioned at an angle of 45° with respect to the horizontal.) The layer has the following characteristics: abrasion resistance, hydrophobicity, oilyphobicity, low friction coefficient, clear and transparent appearance, light transmission equivalent to the light transmission of the glass plate before treatment.

Surface energy test

Surface energy lower than 12 dynes/cm (6–8 dynes/cm)

Taber Abraser test

A delta haze of less than 0.1% was measured by the method ASTM D 1044-94, using a Taber abraser under the conditions where the abrading wheel was a CS-10F wheel, the load was 500 g and the number of rotations was 1,000.

Adhesion test

The results of this test is that there is a good adhesion of the layer or coating, even after immersion of the glass plate in boiling water for 1 hour. When using the method disclosed in DIN 53151. the edges of the cuts were completely smooth and none of the square of the lattices of the cuts is detached, showing therefore an excellent adhesion.

UV test

The UV resistance was determined by using the test Q.U.V. FS 40, with successive cycles of 8 hours UV B radiation at 70° C. and 4 hours condensation at 50° C. After 1000 hours, the coating was still water repellent.

Mechanical test

When using said glass as a car window, it appears that there were less impacts of insects and other dirt, that there was a kind of jumping effect for the particles or insects n the windows, that the cleaning of the window was easier and that a perfect cleaning could be reached with a wiper blade provided with a fluoro or fluorinated layer or coating. It appears also that the same cold weather environment (temperature of −5° C.), no freeze was formed on the glass sheet of the invention, while a freeze layer was formed on the non treated glass sheet. The glass sheet of the invention has thus anti freeze properties.

EXAMPLE 2

Example 1 was repeated, except that, instead of dipping, the composition was sprayed on a face of the glass sheet.

EXAMPLE 3

Example 1 was repeated, except that, instead of dipping, the composition was brushed on a face of the glass sheet.

EXAMPLE 4

Example 1 was repeated except that no heat treatment was carried out at 130° C. The drying was carried out at room temperature and was considered as finished after 24 hours. The layer had the same properties than the layer of example 1, except that the delta haze was comprised between 0.2 and 0.3.

EXAMPLE 5

Example 1 was repeated, except that a solution of silane ether of the following formula

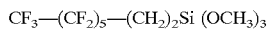

was used.

EXAMPLE 6

Example 1 was repeated, except that the following compositions A and B were used.

| Example | % weight | 6A | 6B | 6C | 6D | 6E | 6F |
|---|---|---|---|---|---|---|---|
| Composition A | | | | | | | |
| | DEP | 2.0 | 2.0 | 2.0 | 1.0 | 1.0 | 1.0 |
| | Silane | 3.0 | 4.0 | 2.0 | 2.0 | 2.0 | 3.0 |
| | methanol | | | | 23.0 | 74.0 | |
| | ethanol | 95.0 | 94.0 | 96.0 | 74.0 | 23.0 | 50.0 |
| | propanol | | | | | | 46.0 |
| Composition B | | | | | | | |
| | DEP | 1.0 | 1.0 | 1.0 | 1.0 | | |
| | Ethanol | 97.0 | 96.0 | 98.0 | 82.0 | 98.0 | 80.0 |
| | HCl | 2.0 | 3.0 | 1.0 | 2.0 | 2.0 | 2.0 |
| | methanol | | | | 15.0 | | 18.0 |

Silane: silane ether used in example 1
DEP: diethyl phthalate
HCl: concentrated hydrochloric acid (37% HCl - 63% water)
Ethanol: absolute ethanol Silane: silane ether used in example 1
DEP: diethyl phthalate
HCl: concentrated hydrochloric acid (37% HCl—63% water)
Ethanol: absolute ethanol

EXAMPLE 7

A composition containing ethanol, HCl, DEP (diethyl phthalate) has been prepared by mixing 8 parts by weight HCl (37% aqueous hydrochloric acid solution) with 90 parts by weight ethanol (absolute), and by adding to said mixture 2 parts by weight DEP. The composition C was placed in a container.

A solution of silane ether (60%) of the following formula

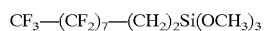

in ethanol was placed in another container.

30 minutes before applying the silane onto the glass plate, the silane ether solution was mixed with additional ethanol (absolute) so as to reduce the silane ether consent to 1%. 1 part by weight of said silane ether mixture was then mixed with 0.1 part by weight of the 8% hydrochloric (aqueous solution containing 37% HCl) composition.

The so obtained composition was applied on the glass sheet as in example 1.

EXAMPLE 8

Example 1 was repeated, except that a solution of silane ether of the following formula $CF_3$—$(CF_2)_7Si(OCH_3)_3$ was used.

EXAMPLE 9

Example 1 was repeated, except that a solution containing 2% by weight of silane ether of the following formula

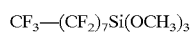

and 2% by weight of silane ether of the following formula $CF_3$—$(CF_2)_7$—$(CH_2)_2Si(OCH_3)_3$ was used.

EXAMPLE 10

Various kits similar to the kits of example 6 have been prepared, except that the mixing weight ratio composition B/composition A was greater than 1:1, i.e. more than one part by weight of composition B was mixed with one part of the composition A.

The following table gives the compositions A and B of the kits which were prepared.

| Example | % weight | 10A | 10B | 10C | 10D | 10E | 10F |
|---|---|---|---|---|---|---|---|
| Composition A | | | | | | | |
| | DEP | 0.5 | 1.0 | 2.0 | 1.0 | 40.0 | 0.5 |
| | Silane | 60.0 | 60.0 | 70.0 | 60.0 | 60.0 | 70.0 |
| | methanol | | | | 10.0 | | |
| | ethanol | 39.5 | 39.0 | 28.0 | 29.0 | | 20.0 |
| | propanol | | | | | | 9.5 |
| Composition B | | | | | | | |
| | DEP | 1.0 | 1.0 | 1.0 | 1.0 | | 3.0 |
| | Ethanol | 97.0 | 96.0 | 98.0 | 82.0 | 98.0 | 95.0 |
| | HCl | 2.0 | 3.0 | 1.0 | 2.0 | 2.0 | 2.0 |
| | methanol | | | | 15.0 | | |
| Mixing ratio Part of composition B (g) per part of composition A (g) | | 50:1 | 100/1 | 80/1 | 20:1 | 50:1 | 50:1 |

Silane: silane ether used in example 1
DEP: diethyl phthalate
HCl: concentrated hydrochloric acid (37% HCl - 63% water)
Ethanol: absolute ethanol Silane: silane ether used in example 1
DEP: diethyl phthalate HCl: concentrated hydrochloric acid (37% HCl—63water)
Ethanol: absolute ethanol In the kits of example 10, the silane containing composition had a high silane concentration, whereby said silane containing composition was mixed with a high amount of composition B. Preferably the mixed composition to be applied on the siliceous substrate has a silane—silanol content of about 2% by weight.

EXAMPLE 11

A composition was prepared by dissolving a silane of the formula

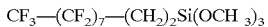

$CF_3—(CF_2)_7—(CH_2)_2Si(OCH_3)_3$ in ethanol, and by mixing to said mixture diethyl phthalate and acetic anhydride. The so obtained solution had the following composition: 2% silane, 1% diethyl phthalate, 2% acetic anhydride and 95% ethanol. Said composition was placed in a container.

30 minutes before applying the solution onto a siliceous substrate (glass plate), 2 ml water was added and mixed to 100 ml of the solution.

Other anhydrides can be used in example 11, such as maleic anhydride, etc.

Although the examples 1 to 10 described here above contains only HCl, it is clear that the process according to the invention can be carried out in presence of a mixture of HCl with another acid, preferably not attacking the glass surface, such as sulphuric acid, nitric acid, organic acids, chlorinated organic acids, for example acetic acid, formic acid, glutaric acid, maleic acid, chloro acetic acid, di chloro acetic acid, chloro formic acid, etc.

If required or necessary, a previously treated glass or siliceous substrate according to the process of the invention can be coated again in accordance to the process of the invention. Such a further coating can be advantageous in case the fluoro polysiloxane layer and/or the face of the substrate provided with the fluoro silane polysiloxane layer have been partially or completely damaged, so as to restore the properties of the siliceous substrate of the invention.

Examples of other possible fluorinated silane derivative suitable to be used in the process of the invention are fluorinated derivatives of the group fluoroaliphatic polymeric esters, fluorinated alkyl polyoxyethylene ethanols, fluorinated silane of the general formula:

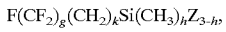

$F(CF_2)_g(CH_2)_kSi(CH_3)_hZ_{3-h}$, wherein Z is chloro, hydroxy, methoxy or ethoxy, g is an integer selected from the integers 1 to 10, k is the integer 0, 1 or 2, and h is the integer 0, 1 and 2.

Examples of such fluorinated silane derivatives include trifluoroacetoxypropyl tri-($C_1$–$C_2$)alkoxysilanes, 3-(heptafluoroisopropoxy)propyltrichlorosilane, 3-(heptafluoroisopropoxy)propyltriethoxysilane, N-(3-triethoxysilylpropyl)perfluorooctanoamide, N-(3-triethoxysilylpropyl)perfluoro(2,5-dimethyl-3,6-dioxanonanoyl)amide, (tridecafluoro-1,1,2,2-tetrahydrooctyl)-1-dimethylchlorosilane, (tridecafluoro-1,1,2,2-tetrahydrooctyl)-1methyldichlorosilane, (tridecafluoro-1,1,2,2-tetrahydrooctyl)-1-trichlorosilane, tridecafluoro-1,1,2,2-tetrahydrooctyl-1-triethoxysilane, 3,3,3-trifluoropropyldimethylchlorosilane, (3,3,3-trifluoropropyl)methydichlorosilane, (3,3,3-trifluoropropyl)methyldimethoxysilane, (3,3,3trifluoropropyl)methyldimethoxysilane, (3,3,3-trifluoropropyl)trichlorosilane, (3,3,3-trifluoropropyl)trimethoxysilane, 1H,1H,2H,2H-perfluoroalkyltriethoxysilane, 1H,1H,2H,2H-perfluorodecyldimethylchlorosilane, 1H,1H,2H,2H-perfluorodecylmethyldichlorosilane, 1H,1H,2H,2H-perfluorotrichlorosilane, 1H,1H,2H,2H-perfluorotriethoxysilane, 1H,1H,2H,2Hperfluorooctylmethyldich lorosilane, 1H,1H,2H,2H-perfluorooctyltrichlorosilane, and 1H,1H,2H,2H-perfluorooctyltriethoxysilane.

It is clear that prior to applying the polysiloxane layer onto the substrate, the substrate is advantageously treated with a solution for removing possible coating (silane, silicone oil, glue, etc.) present on the surface. Preferably the substrate is treated with a solution which does not degrade the glass substrate. For example, the glass substrate is first treated by means of a solution containing HCl, citric acid, phosphoric acid, etc. or a solution "SILSTRIP LIQUID"® of PENN WHITE (UK) so as to remove impurities attached to the substrate.

The curing is preferably carried out by subjecting the polysiloxane layer to a heat treatment, for example between 75 and 150° C., preferably between 95 and 140° C. However, other curing methods are possible, such as infrared, ultraviolet, gamma or electron radiation.

In the present specification, reference is made to the measurement of a pH by means of a LiCl electrode provided with an open sleeve (flushtrode of Hamilton, USA). The potential measured by using this electrode is the potential measured against a reference electrode, namely an Ag/AgCl reference electrode, with use of 1 molar LiCl in ethanol as electrolyte. This electrode is known as suitable for measuring a pH in a partially aqueous media, as well as in a polar non-aqueous media. It is obvious that other electrode suitable for determining a pH in a non-aqueous or substantially non-aqueous media can also be used for determining the pH.

What is claimed is:

1. A kit for the preparation of a composition for applying to a siliceous substrate a fluoro polysiloxane layer prepared by polymerizing at least one fluoro silane derivative, which after drying has a chemical resistance of at least 1 minute against the action of an aqeuous solution containing 25% by weight of sodium hydroxide and having a temperature of 25° C., and kit comprising a first container containing a first composition and a second container comprising a second composition, the first and second compositions having at least partly to be mixed together for forming a mixture to be applied onto the siliceous substrate, in which the first composition is substantially free of water and acid and comprises 0.1 to 100% by weight fluoro silane and 0 to 99% by weight organic polar solvent system for said fluoro silane, while the second composition comprises at least an organic polar solvent for the fluoro silane, less than 20% water and an acid system, the amount of acid system of the second composition mixed with a part of the first composition being sufficient for the preparation of a mixture with a pH lower than 4 to be applied on the siliceous substrate, said pH being measured at 25° C. by using a LiCl electrode with an open sleeve, while the amount of polar solvent in the first and second compositions is sufficient for ensuring substantially the complete dissolution of the fluoro silane derivative.

2. The kit of claim 1, in which the second composition contains less than 10% water and an amount of acid sufficient for the preparation of a mixture with a pH lower than 2 to be applied on the siliceous substrate, said pH being measured at 25° C. by using a LiCl electrode with an open sleeve.

3. The kit of claim 2, in which the second composition contains from 0.5 to 20% by weight hydrochloric acid.

4. The kit of claim 1, in which the first composition contains from 2 to 70% by weight fluoro aliphatic silane derivative and a polar solvent in an amount sufficient for ensuring the substantially complete dissolution of the fluoro silane derivative.

5. The kit of claim 1, in which the polar solvent is selected from the group consisting of fluorine-containing polar solvents, aliphatic or aromatic polar solvents, ketones, esters and mixtures thereof.

6. The kit of claim 1, in which the polar solvent is selected from the group consisting of $C_1$–$C_6$ alkanol, and aliphatic alcohols of the empirical formula:

$$[(R^3)_iR^4](C_1\text{–}C_6)OH$$

wherein $R^3$ and $R^4$ are each $C_1$–$C_4$ alkoxy, and i is the integer 0 or 1, and mixtures thereof.

7. The kit of claim 1, in which the polar solvent is selected from the group consisting of methanol, ethanol, 2-methoxy ethanol, 1-propanol, 2-propanol, and mixtures thereof.

8. The kit of claim 1, in which the first composition contains from 0.1 to 99.5% by weight of phthalic acid ester.

9. The kit of claim 1, in which the first composition contains from 0.1 to 20% by weight of phthalic acid ester.

10. The kit of claim 9, in which the phthalic acid ester is selected from the group consisting of di(alkyl $C_2$–$C_{18}$) phthalates and mixtures thereof.

11. The kit of claim 10, in which the phthalic acid ester is selected from the group consisting of diethyl phthalate, dipropyl phthalate, dibutyl phthalate, dipentyl phthalate, dihexyl phthalate, dioctyl phthalate, di isopropyl phthalate, di isobutyl phthalate, di isopentyl phthalate, di isohexyl phthalate, di isooctyl phthalate and mixture thereof.

12. The kit of claim 1, in which the second composition contains from 0.1 to 20% by weight of phthalic acid ester.

13. The kit of claim 12, in which the phthalic acid ester is selected from the group consisting of di(alkyl $C_2$–$C_{18}$) phthalates and mixtures thereof.

14. The kit of claim 13, in which the phthalic acid ester is selected from the group consisting of diethyl phthalate, dipropyl phthalate, dibutyl phthalate, dipentyl phthalate, dihexyl phthalate, dioctyl phthalate, di isopropyl phthalate, di isobutyl phthalate, di isopentyl phthalate, di isohexyl phthalate, di isocytyl phthalate and mixture thereof.

15. The kit of claim 1, in which the first composition contains a fluoro silane derivative selected from the group consisting of fluoro aliphatic silanes with one silicon atom chemically bound to three hydroxy groups, ethers of said fluoro aliphatic silanes with one silicon atom chemically bound to three hydroxy groups, alkyl ethers of said fluoro aliphatic silane with one silicon atom chemically bound to three hydroxy groups, linear fluoro aliphatic polysiloxane of the formula

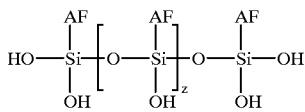

in which
AF is a fluoro aliphatic group, and
Z is an integer from 0 to 6,
and mixtures thereof.

16. The kit of claim 15, in which the AF group has an end carbon atom bound to three fluorine atoms.

17. The kit of claim 1, in which the composition contains a fluoro silane derivative selected from the group consisting of fluoro aliphatic silanes with one silicon atom chemically bound to three hydroxy groups and with an aliphatic group substantially fully substituted with fluorine atoms, ethers of said fluoro aliphatic silanes with one silicon atom chemically bound to three hydroxy groups and with an aliphatic group substantially fully substituted with fluorine atoms, alkyl ethers of said fluoro aliphatic silanes with one silicon atom chemically bound to three hydroxy groups and with an aliphatic group substantially fully substituted with fluorine atoms, linear fluoro aliphatic polysiloxanes of the formula

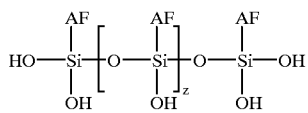

in which
AF is a fluoro linear aliphatic group with 2 to 10 carbon atoms, said aliphatic group being substantially fully substituted with fluorine atoms, and
Z is an integer from 0 to 6, and
mixtures thereof.

18. The kit of claim 1, in which the first composition contains a fluoro silane derivative selected from the group consisting of tridecafluorotetrahydrooctyltrihydroxy-silane, perfluorodecyltrihydroxysilane, ethers of said fluoro aliphatic silane derivatives, alkyl ethers of said fluoro aliphatic silane derivatives, linear fluoro aliphatic polysiloxanes of the formula

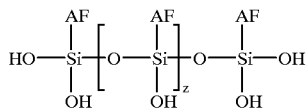

in which
AF is a fluoro linear aliphatic group selected from the group consisting of $CF_3(CF_2)_5$—$(CH_2)_2$— and $CF_3$—$(CF_2)_7$—$(CH_2)_2$— and mixtures thereof, and
Z is an integer from 0 to 6,
and mixtures thereof.

19. The kit of claim 1, in which the first composition contains from 0.1 to 99.9% by weight of an organic compound soluble in the organic polar solvent for the fluoro silane derivative, but substantially insoluble in water.

20. The kit of claim 1, in which the second composition contains from 0.1 to 99.9% by weight of an organic compound soluble in the organic polar solvent for the fluoro silane derivative, but substantially insolube in water.

21. The kit of claim 1, in which the first composition contains from 0.1 to 20% by weight of an organic compound soluble in the organic polar solvent for the fluoro silane derivative, but substantially insoluble in water.

22. The kit of claim 1, in which the second composition contains from 0.1 to 20% by weight of an organic compound soluble in the organic polar solvent for the fluoro silane derivative, but substantially insoluble in water.

* * * * *